United States Patent [19]

Tuller et al.

[11] 4,322,480

[45] Mar. 30, 1982

[54] POLYAMIDE-POLYETHYLENE LAMINATES

[75] Inventors: Harold W. Tuller, Long Valley; Stephen R. Schulze, West Caldwell; George S. Wilson, Ringwood, all of N.J.

[73] Assignee: Allied Chemical Corporation, Morris Township, Morris County, N.J.

[21] Appl. No.: 220,884

[22] Filed: Dec. 29, 1980

[51] Int. Cl.³ .................... B32B 27/34; B32B 27/32
[52] U.S. Cl. ......................... 428/476.1; 428/475.8; 428/476.3; 428/476.6; 428/476.9; 428/523
[58] Field of Search ................. 428/475.8, 476.1, 523, 428/476.3, 476.6, 476.9

[56] References Cited

U.S. PATENT DOCUMENTS

| | | | |
|---|---|---|---|
| 2,805,960 | 9/1957 | Wolinski | 428/475.8 |
| 3,198,692 | 8/1965 | Bridgeford | 428/523 |
| 3,322,711 | 5/1967 | Bush | 260/29.6 X |
| 3,901,755 | 8/1975 | Martin | 428/476.1 |
| 4,215,176 | 7/1980 | Tuller et al. | 428/476 X |

FOREIGN PATENT DOCUMENTS 4777600  3/1974  Japan ............................. 428/476.1

*Primary Examiner*—Ellis P. Robinson
*Attorney, Agent, or Firm*—Richard A. Negin

[57] ABSTRACT

A laminate structure comprising at least one layer of a polyamide and at least one layer of polyethylene containing from 0.1 to 20 percent based on the weight of the polyethylene of oxidized high density polyethylene.

24 Claims, No Drawings

POLYAMIDE-POLYETHYLENE LAMINATES

BACKGROUND OF THE INVENTION

1. Field of the Invention

This invention relates to multi-layered laminated structures comprised of at least one layer of a polyamide, the layer being contiguous to a layer of polyethylene containing oxidized polyethylene.

2. Description of the Prior Art

Laminates of polyamides with polyethylene are known in the art. These laminate structures, either in the form of films or sheets, can be fabricated into products such as food packaging, bottles, and the like. Such laminates offer both the advantages of polyamides, such as strength, abrasion resistance, low friction, heat resistance, and low gas permeability, as well as the cost advantage and low water permeability of polyethylene.

Although these polyamide/polyethylene laminates offer the aforementioned advantages, insufficient adhesion between the polyamide layer and the polyethylene layer reduces their strength and usefulness. This adhesion can be particularly low under certain conditions, such as high moisture levels or cold temperatures.

U.S. Pat. No. 4,215,176 discloses a multi-layered laminate having at least one layer of a polyamide such as polyepsiloncaprolactam containing an excess of terminal amine groups and at least one layer, opposing the polyamide layer, containing a polymer having pendant carboxylic acid groups, their salts, carbonates, or acid anhydrides.

SUMMARY OF THE INVENTION

In accordance with the present invention, there is provided a multi-layered laminated structure comprised of at least one layer of a polyamide bonded to at least one opposing layer of polyethylene containing from 0.1 to 20.0 weight percent, preferably 0.1 to 10 weight percent, based on the weight of the polyethylene, of oxidized polyethylene, and more preferably of oxidized high density polyethylene. Preferably, the polyamide contains amine and acid terminal groups, with an excess of amine terminated groups, and the polyethylene is high density polyethylene.

In a more preferred embodiment in accordance with the present invention, there is provided a multi-layered laminated structure comprised of at least one layer of polyepsiloncaprolactam bonded to at least one opposing layer of high density polyethylene containing from 3 percent to 10 percent oxidized polyethylene, based on the weight of high density polyethylene. Preferably, the polyesiloncaprolactam of this embodiment has amine and acid terminated groups, wherein at least 1.5 times as many amine end groups than acid end groups are present. The oxidized polyethylene preferably has a molecular weight from 500 to 8,000 and an acid number from 10 to 40 mg KOH/gram of oxidized polyethylene.

Laminates of the present invention are characterized by superior adhesion of the polyamide layer to the polyethylene layer such that the layers will not separate under adverse conditions, such as relatively high moisture levels and/or relatively cold temperatures.

DETAILED DESCRIPTION

Polyamides suitable for use as the polyamide layer of the laminate of the present invention include the long chain polymeric amides having recurring amide groups as part of the polymer backbone, and preferably having a number average molecular weight, as measured by membrane osmometry of about 15,000 to 40,000. The polyamides can have equal amine and acid terminal groups. Preferably, the polyamides contain at least 1.5 times as many amine groups as acid terminal groups. Preferably, polyamides include polyepsiloncaprolactam and polyhexamethylene diamine.

Particularly preferred are polyamides prepared by the polymerization of epsiloncaprolactam in the presence of a comonomer containing two or more amine groups per molecule, such as hexamethylene diamine.

Other lesser preferred examples of such polyamides are: (a) those prepared by the condensation of a diamine with a dibasic acid in the presence of an excess amount of diamine or a multifunctional amine compound containing at least three amino groups per molecule, with the diamine preferably being hexamethylene diamine and the dibasic acid being adipic acid or sebasic; (b) random interpolymers of the above monomer groups having an excess amount of diamine or other multifunctional amine compound; and (c) blends or block interpolymers comprising two or more of these polyamides, at least one of which is prepared with a surplus of polyfunctional amine groups as herein described. Preferred are those polyamides based on the polymerization of epsiloncaprolactam and those based on a diamine and a diacid, more preferred are those based on epsiloncaprolactam.

The polyamide can be produced by any conventional process known in the art. Illustrative of one such process which is suitable for producing polyepsilocaprolactam involves two steps. The first step consists of heating epsiloncaprolactam and a hexamethylene diamine and water to a temperature of from about 180° to 300° C. under superatmospheric pressure (about 200 to 280 lbs/in$^2$) to effect partial polymerization. The water is allowed to distill gradually from the reaction mixture while the polymerization continues after most of the monomer has been converted to a low molecular weight polymer. The pressure is reduced to atmospheric pressure wherein the second step is commenced, which comprises completing the polymerization by heating at atmospheric pressure in the range of about 180° to 300° C.

Other lesser preferred examples of diamines suitable for use herein include tetramethylene diamine, pentamethylene diamine, octamethylene diamine and decamethylene diamine. The amount of diamine needed to produce the high diamine-containing polyamides of the present invention varies depending on the amount of amine desired and the molecular weight of the resulting polymer and can be easily determined by one skilled in the art. For example, about 0.25 mol percent of hexamethylene diamine is required to produce a polyepsiloncaprolactam of about 21,000 number average molecular weight having about 80 equivalents/10$^6$ gm amine end groups and about 17 equivalents/10$^6$ gm acid end groups. Generally, the amount of amine end groups required in the polyamide, in order to give improved adhesion to the alkylenic interpolymers, is at least 1.5 times the amount of acid end groups, preferably at least 2 times, more preferably at least 3 times, and most preferably at least 4 times.

It is preferred that the polyamide used herein have a maximum amount of amine functionality. The maximum amount of amine functionality is dependent on the number average molecular weight of the polyamide and can be easily calculated by use of the following formula:

$$\frac{\frac{10^6}{m} + \sqrt{\frac{10^{12}}{m^2} - 450}}{\frac{10^6}{m} - \sqrt{\frac{10^{12}}{m^2} - 450}}$$

where R is the maximum practical ratio of amine to acid functionality and m is the number average molecular weight. For example, for a polyepsiloncaprolactam having a number average molecular weight of 40,000, the maximum ratio of amine to acid functionality in the polyamide would be about 3.2 to 1, and for a number average molecular weight of 17,000, the maximum ratio of amine to acid would be about 29 to 1.

The opposing layer comprises polyethylene containing from 0.1 percent to 20 percent, preferably 0.1 percent to 10 percent, and more preferably 3 percent to 10 percent, based on the weight of the polyethylene of oxidized polyethylene. The oxidized polyethylene layer can be oxidized low density polyethylene, oxidized linear low density polyethylene, or oxidized high density polyethylene. The oxidized polyethylene is preferably oxidized high density polyethylene.

The opposing polyethylene layer can be low density polyethylene, linear low density (low pressure) polyethylene, or high density polyethylene. The specific gravity range is from about 0.910 to 0.965. Low density polyethylene is commonly manufactured at high pressures of 15,000 psi to 45,000 psi, using a free radical catalyst such as oxygen, peroxide or azo catalysts. The specific gravity of low density polyethylene is from about 0.910 to about 0.935.

Linear low density or low pressure polethylene is manufactured at lower pressures by either the solution or gas phase process, using a coordination catalyst such as a Ziegler catalyst. The linear low density polyethylene has substantially less long chain branches than low density polyethylene. The specific gravity range of linear low density polyethylene is from about 0.915 to about 0.935.

Linear low density or low pressure polethylene is manufactured at lower pressures by either the solution or gas phase process, using a coordination catalyst such as a Ziegler catalyst. The linear low density polyethylene has substantially less long chain branches than low density polyethylene. The specific gravity range of linear low density polyethylene is from about 0.915 to about 0.935.

High density polyethylene can be produced at 60° C. to 80° C., and pressures lower than 1500 psig and as low as 100 psig, using a highly active catalyst. The usual catalyst is an alkyl metal derivative, such as triethyl aluminum, activated with titanium tetrachloride or another heavy metal derivative.

The oxidized polyethylene useful in the present invention has a molecular weight of from 500 to 8,000, and preferably from 5,000 to 6,000, and an acid number from 10 to 40, and preferably from 15 to 30, small grams of potassium hydroxide required to neutralize one gram of the oxidized polyethylene. The specific gravity is from 0.915 to about 0.99 and preferably from 0.97 to 0.99 (high density). The oxidized polyethylene can be prepared by methods known in the art. A typical method is the oxidation of polyethylene in the manner described in U.S. Pat. Nos. 3,322,711 and 3,129,667.

Preferred oxidized polyethylenes are summarized in Table I.

TABLE I

| OPE | Softening Point °C. (ASTM-28) | Hardness dmm (ASTM D-5) | Density g/cc (ASTM D-1505) | Brookfield Viscosity @ 140° C. Centipoises | Acid No. mg KOH g OHDPE |
|---|---|---|---|---|---|
| A | 104 | 5.5 | 0.93 | 200 | 16 |
| B | 107 | 2.5 | 0.93 | 210 | 16 |
| C | 100 | 9.0 | 0.92 | 185 | 15 |
| D | 110 | 1.5 | 0.94 | 250 | 16 |
| E | 111 | 1.2 | 0.95 | 250 | 16 |
| F | 140 | 0.5 | 0.98 | 30,000[1] | 16 |
| G | 138 | 0.5 | 0.99 | 9,000[1] | 28 |

[1] @ 149° C.

The most preferred oxidized polyethylene (OPE) is oxidized high density polyethylene sample F of Table I (OHDP-F), having a molecular weight from about 5,000 to 7,000.

The polyamide layers can contain or be blended with up to 25 weight percent of another polymeric material, preferably up to 10 weight percent, and more preferably up to 5 weight percent. When the other polymeric material is that of the opposing layer, up to 50 weight percent of such material can be blended into the polyamide layer. The blending of other polymers can cause the film to lose some of its clarity.

It will be noted that the other polymeric materials which can be blended into the composites of the present invention can be recycled scrap resulting from the production of the composites herein or from other composite structures, as long as the aforementioned requirements as to functional groups are met. When the scrap used is obtained solely from the manufacture of the composites of the present invention, it can be recycled in such a way that it is used as part of, or in place of, one or more of the layers of the composite such that a polyamide layer blended with said scrap can contain up to 50 weight percent of the nonpolyamide material and the opposing layer can contain up to 50 weight percent polyamide.

The laminated structures of the present invention can be prepared by any conventional method generally known in the art. Non-limiting examples of such methods include blow film, cast film coextrusion, coating extrusion, coextrusion, coextrusion blow molding, thermal lamination, multi-component injection molding, and layered rotational molding.

In film or sheet extrusion, the polyamide layer and high density polyethylene layer are each extruded from separate extruders and subsequently laminated together at elevated temperatures by passage through a common die, or adjacent dies.

Extrusion coating, for purposes of the present invention, is the extrusion of a film or sheet of the high density polyethylene onto a prefabricated film or sheet of polyamide or vice versa.

Rotational molding as used herein includes the procedure wherein both the polyamide and the high density polyethylene are rotatably blended in a rotational mold. In a typical rotational molding process, the polyamide is introduced into the mold and the mold is heated while rotating. The alkylenic interpolymer is then fed into the mold. The temperature in the mold is greater than the melting point of the highest melting material, but below the degradation temperature of either of the materials. The mold is then rotated for a time sufficient to achieve good distribution of material on the inner wall of the mold. The mold is then cooled while rotating to solidify the materials. Also included is rotation molding of the polyamide and the high density polyethylene by the method of U.S. Pat. No. 3,542,912. In this method, the polyamide is disposed innermost of the molded article.

The oxidized polyethylene can be added to the polyethylene by suitable methods including: adding it at the end of the polymerization step; dry blending followed by extrusion; melt blending in a suitable mixing means such as an internal mixer; and dry blending immediately prior to forming the film.

The compositions of the invention may be modified by one or more conventional additives, such as stabilizers and inhibitors of oxidative, thermal, and ultraviolet light degradation; lubricants and mold release agents, colorants including dyes and pigments, fibrous and particulate fillers and reinforcements, nucleating agents, plasticizers, etc.

The examples which follow illustrate the invention and set forth the best mode which we have contemplated for carrying out the invention, but are intended as illustrative only and not as limiting.

EXAMPLES 1, 2

Various single layer films of polyepsiloncaprolactam and high density polyethylene, Allied Chemical PAXON ® having a melt index of 0.3, and a specific gravity of 0.941 were prepared. The thickness of the layers was between 3½ and 4 mils and they were prepared by using a 1¼ inch extruder equipped with a 6 inch wide film die and a double roll casting take-up. The extruder and die temperatures were controlled to 260° C. (500° F.) and the casting rolls to about 79.4° C. (175° F.).

Table II summarizes the amine to acid termination ratio of the polyepsiloncaprolactam used, and the additives to the high density polyethylene. The additives to the high density polyethylene were physically blended prior to extrusion. The high density polyethylene used was PAXON ® 003 produced by Allied Chemical, having a melt index (ASTM D-1235) of 0.3 and a specific gravity of 0.941.

In Comparatives 1 and 4 the high density polyethylene layer contains 5 weight percent Surlyn TM 1650. Surlyn 1650 is the zinc salt of an ethylene/methacrylic acid copolymer available from the Du Pont Company. It has a melt flow index of 1.5 decigrams/minute and a specific gravity of 0.950.

In Comparatives 3 and 5, the high density polyethylene layer contains 5 weight percent of DOW EAA 455 (EAA). Dow EAA 455 is an ethylene/acrylic acid copolymer having a melt index of 5.5 g/10 minutes and an acrylic acid content of 8 weight percent (about 3.3 mol percent).

In Examples 1 and 2, the high density polyethylene layer contains 5 weight percent OHDPE-F as described in Table I.

The polyepsiloncaprolactam and high density polyethylene films were produced separately. The polyepsiloncaprolactam film was vacuum dried at 83° C. for about 2½ hours and both films were cut into strips 1½ inches wide and 5 inches wide. A layer of polyepsiloncaprolactam film and a layer of high density polyethylene film were sandwiched between 1 mil thick aluminum film and heat sealed for 6.0 seconds at a pressure of 60 psi using a standard bag sealer equipped with 1 inch platens controlled at a temperature of 260° C. (500° F.).

The aluminum film was removed from only the polyepsiloncaprolactam side and the laminates were immersed in water for 3 hours after which they were tested for peel strength at 5 inches/minute in an 20 Instron testing machine. The resulting peel strengths for dry samples as well as the immersed samples are shown in Table II below and represent the force required to separate the polyepsiloncaprolactam layer from the high density polyethylene layer.

TABLE II

| | Amine/Acid | Additive (wt %) | Peel Strength gms/1" wide strip Dry | Wet |
|---|---|---|---|---|
| Comp. 1 | 1.00 | — | 40 | 27 |
| Comp. 2 | 1.00 | 5% Surlyn 1650 | 64 | 36 |
| Comp. 3 | 1.00 | 5% EAA | 44 | — |
| Ex. 1 | 1.00 | 5% OHDPE - F | 210 | 108 |
| Comp. 4 | 4.33 | — | 64 | 36 |
| Comp. 5 | 4.33 | 5% Surlyn 1650 | 98 | 54 |
| Comp. 6 | 4.33 | 5% EAA | 66 | — |
| Ex. 2 | 4.33 | 5% OHDPE - F | 563 | 475 |

The above table shows that a polyepsiloncaprolactam layer and a layer of high density polyethylene containing oxidized high density polyethylene have increased adhesion for polyepsiloncaprolactam having an equal number of amine and acid terminal groups or an excess number of amine groups. A layer of polyepsiloncaprolactam, wherein the polyepsiloncaprolactam has an excess of amine terminal groups, and a layer of high density polyethylene, containing oxidized high density polyethylene has the highest peel strength.

EXAMPLES 3-5

Two layer laminates were prepared and tested wet according to procedure of Examples 1 and 2. The high density polyethylene and oxidized high density polyethylene used in Examples 3-5 were the same type as those used in Examples 1 and 2. The amounts used are described in Table III.

In Comparative 8 and 11 the high density polyethylene layer contains Plexar TM 3 which is anhydride modified ethylene vinyl acetate copolymer from Chemplex Corp., and has a melt index (ASTM D-1238) of about 3.0.

In Comparatives 9 and 12 the high density polyethylene layer contains Plexar TM 5 which is anhydride modified ethylene vinyl acetate copolymer from Chemplex Corp. having more anhydride modification than Plexar 3. The melt index (ASTN D–1238) of Plexar 5 is about 3.0 to 4.0.

TABLE III

| | Amine/Acid | Additive | Peel Strength (wet) gms/1" wide strip |
|---|---|---|---|
| Comp. 7 | 1.00 | — | 0 |
| Comp. 8 | 1.00 | 10% Plexar 3 | 69 |
| Comp. 9 | 1.00 | 10% Plexar 5 | 47 |
| Ex. 4 | 1.00 | 10% OHDPE - F | 80 |
| Comp. 10 | 4.33 | — | 0 |
| Comp. 11 | 4.33 | 5% Plexar 3 | 35 |
| Comp. 12 | 4.33 | 10% Plexar 5 | 136 |
| Ex. 4 | 4.33 | 5% OHDPE - F | 225 |
| Ex. 5 | 4.33 | 10% OHDPE - F | 3175 |

The above table summarizing the results of Examples 3-5 is generally in agreement with the results in Examples 1 and 2. The addition of oxidized high density polyethylene to a layer of high density polyethylene improves the adhesion of the layer of high density polyethylene to a layer of polyepsiloncaprolactam having an equal number of acid and amine termination or an excess of amine termination. Additionally, increasing the concentration to 10 weight percent oxidizing high density polyethylene further improves the adhesion. It has been found that increasing the concentration of the oxidized high density polyethylene in the high density polyethylene layer from 10 percent to 20 percent causes the film to become more brittle and to process with more difficultly. Above 20 percent oxidized high density polyethylene results in an unsatisfactory polyethylene film layer.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

What is claimed is:

1. A laminate structure comprised of:
   at least one layer of a polyamide; and
   at least one layer of polyethylene containing from 0.1 to 20% based on the weight of the polyethylene of oxidized polyethylene.

2. The laminate structure of claim 1 wherein the polyethylene layer contains from 0.1 to 10% based on the weight of the polyethylene of oxidized polyethylene.

3. The laminate structure of claim 1 wherein the polyethylene layer has a specific gravity of 0.91 to 0.965.

4. The laminate structure of claim 1 wherein the polyethylene layer is high density polyethylene.

5. The laminate structure of claim 4 wherein the polyethylene layer has a specific gravity of 0.94 to 0.965.

6. The laminate structure of claim 4 wherein the high density polyethylene layer contains from 3 to 7% based on the weight of the high density polyethylene of oxidized polyethylene.

7. The laminate structure of claim 1 wherein the oxidized polyethylene has a specific gravity of from 0.915 to 0.99.

8. The laminate structure of claim 7 wherein the oxidized polyethylene has a specific gravity of from 0.97 to 0.99.

9. The laminate structure as recited in claim 1 wherein the oxidized polyethylene is oxidized high density polyethylene.

10. The laminate structure of claim 1 wherein the oxidized polyethylene has a molecular weight of from about 500 to about 8,000.

11. The laminate structure of claim 10 wherein the oxidized polyethylene has an acid number of from about 10 to 40 mg KOH/gm of oxidized polyethylene.

12. The laminate structure of claim 4 wherein the oxidized polyethylene has a molecular weight of from about 5000 to 6000 and an acid number from about 15 to 30 mg KOH/gr of oxidized polyethylene.

13. The laminate structure of claim 4 wherein the polyamide is polyepsiloncaprolactam or polyhexamethylene adipamide.

14. The laminate structure of claim 4 wherein the polyamide is polyepsiloncaprolactam.

15. The laimate structure as recited in claim 4 wherein at least one layer of the polyamide has about 60 to 97 mol percent of its end groups as amine end groups.

16. The laminate as recited in claim 15 wherein the polyamide contains amine and acid terminal groups, wherein at least 1.5 times as many amine end groups than acid groups are present.

17. A laminate structure composed of:
    at least one layer of polyepsilon caprolactam;
    at least one layer of high density polyethylene containing from 3 percent to 7 percent, based on the weight of the high density polyethylene, of oxidized poyethylene.

18. The laminated structure of claim 17 wherein the polyepsilon caprolactam has amine and acid terminal groups, wherein at least 1.5 times as many amine end groups than acid end groups are present.

19. The laminated structure as recited in claims 17 or 18 wherein the oxidized polyethylene has a molecular weight from 500 to 8000 and an acid number from 10 to 40 mg KOH/gram of oxidized polyethylene.

20. A laminate structure as recited in claim 19 wherein the oxidized polyethylene is high density polyethylene.

21. A laminate structure comprised of:
    at least one layer comprised of at least 50 wt. %, based on the total weight of the layer, of a polyamide, and
    at least one layer of high density polyethylene containing from 0.1 to 10%, based on the weight of the high density polyethylene of oxidized high density polyethylene.

22. The laminate structure of claim 21 wherein the polyamide is polyepsiloncaprolactam or polyhexamethylene adipamide.

23. The laminate structure of claim 21 wherein at least 75% polyamide is present.

24. The laminate structure as recited in claim 21 wherein the layer of polyamide contains at least 50 wt. percent, based on the total weight of the layer, of a polyamide and a corresponding amount of high density polyethylene containing from 0.1 to 10% based on the weight of the high density polyethylene of oxidized high density polyethylene.

* * * * *